United States Patent [19]

Jelmorini

[11] 4,146,772
[45] Mar. 27, 1979

[54] METHOD OF AND DEVICE FOR PLASMA-MIG WELDING

[75] Inventor: Gerardus Jelmorini, Eindhoven, Netherlands

[73] Assignee: U.S. Philips Corporation, New York, N.Y.

[21] Appl. No.: 760,445

[22] Filed: Jan. 19, 1977

[30] Foreign Application Priority Data

Feb. 20, 1976 [NL] Netherlands .......................... 7601721

[51] Int. Cl.² ................................................ B23K 9/00
[52] U.S. Cl. .................................. 219/121 P; 219/75; 219/137 R
[58] Field of Search ............ 219/121 P, 75, 76, 137 R

[56] References Cited

U.S. PATENT DOCUMENTS

| | | | |
|---|---|---|---|
| 2,847,555 | 8/1958 | Yenni ........................ | 219/76 |
| 3,246,115 | 4/1966 | Johnson ..................... | 219/121 P |
| 3,575,568 | 4/1971 | Tateno ....................... | 219/75 |
| 3,818,175 | 6/1974 | Essers et al. ................ | 219/121 P |
| 4,016,397 | 4/1977 | Essers et al. ................ | 219/121 P |

OTHER PUBLICATIONS

B. E. Pinfold et al., "Plasma–MIG Welding", *Welding & Metal Fabrication*, Dec. 1974, pp. 417–419.

*Primary Examiner*—J. V. Truhe
*Assistant Examiner*—Clifford C. Shaw
*Attorney, Agent, or Firm*—William J. Streeter; Rolf E. Schneider

[57] ABSTRACT

Plasma-MIG welding in which a thermally ionizable inert gas is flowed past a starter non-consumable electrode through a nozzle non-consumable electrode toward a workpiece, firstly a plasma arc is established between such starter non-consumable electrode and such workpiece to initiate and sustain a plasma flow, a consumable electrode is fed through such plasma flow toward the workpiece, secondly a MIG-arc is separately established between such consumable electrode and the workpiece, and finally the nozzle non-consumable electrode is electrically connected to the starter non-consumable electrode so that the plasma arc is taken over by the nozzle non-consumable electrode and extends solely from the nozzle non-consumable electrode to the workpiece.

2 Claims, 1 Drawing Figure

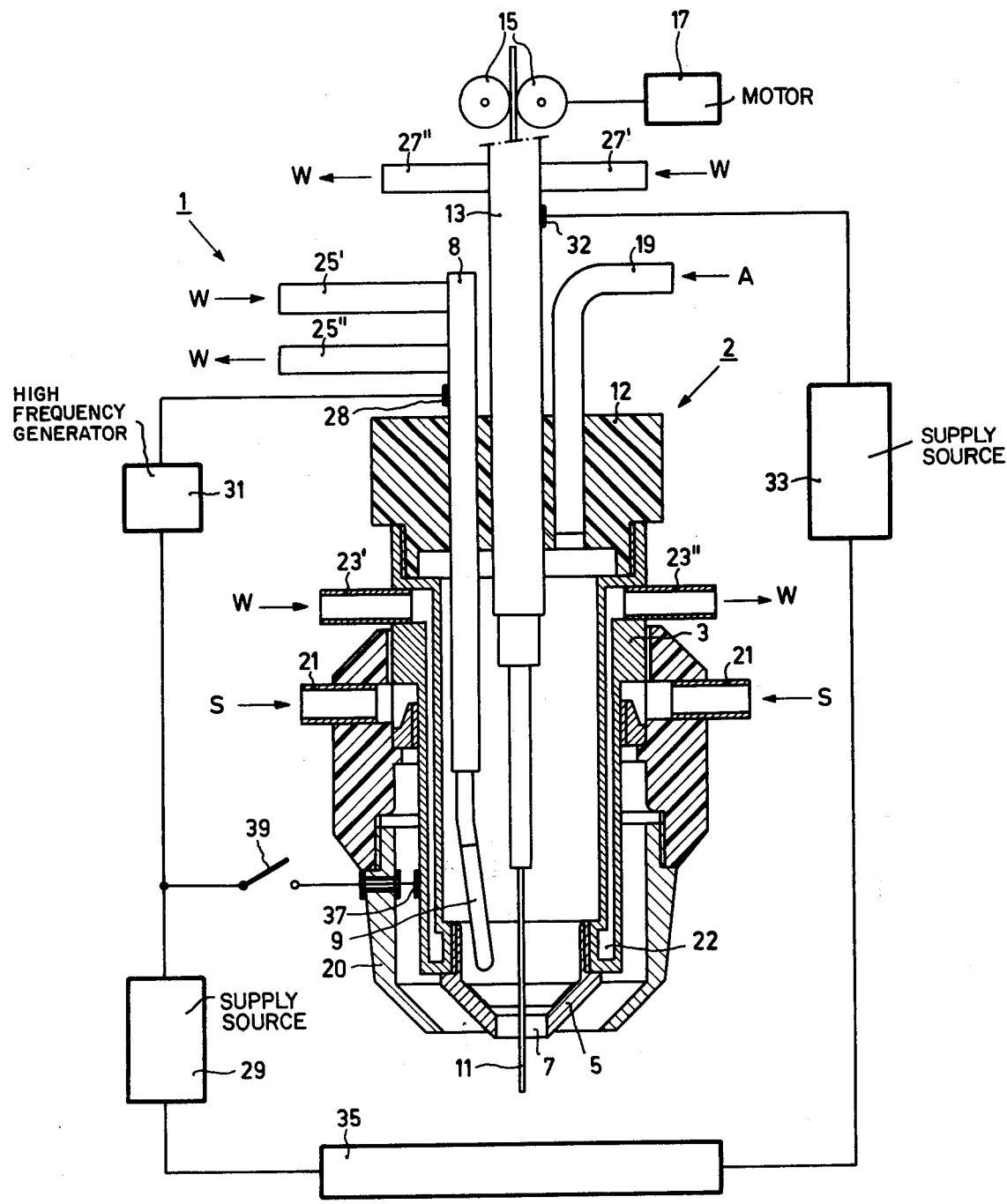

METHOD OF AND DEVICE FOR PLASMA-MIG WELDING

This invention relates to a method of and in apparatus for plasma-MIG welding, in which a plasma arc is maintained in a gas current, a consumable electrode is fed into the gas plasma produced by the plasma arc and through the plasma aperture of a nozzle, and a MIG arc is maintained between the consumable electrode and a workpiece, the plasma arc being maintained between the nozzle and the workpiece.

Such a method is known from application Ser. No. 592,351 filed July 1, 1975, now U.S. Pat. No. 4,016,397, which is a continuation of application Ser. No. 426,958 filed Dec. 20, 1973, now abandoned. An important aspect of this method is the excellent stability of the plasma arc against extinguishing; in addition it is possible to weld with a comparatively short MIG arc, so that the penetration depth in the workpiece is increased.

However, the drawback of this method, in which the nozzle acts as the non-consumable electrode, is that the welding process cannot be started without spattering. To strike the plasma arc, first the MIG arc has to be struck by short-circuiting the consumable electrode with the workpiece, whereupon the plasma arc is spontaneously struck. Such plasma arc adheres to the inner circumference of the plasma aperture in the nozzle and is stabilized geometrically by the electromagnetic field of the current-carrying consumable electrode. Otherwise, if the plasma arc is struck first, the position of the plasma arc root on the nozzle is not clearly defined; therefore it is not possible in this known method to start the welding process by first striking the plasma arc and only then supplying the consumable electrode.

It is an object of the present invention to provide a method in which the welding process can be started in a manner free from disturbances and without spattering.

According to the invention this object is achieved in that, upon starting the welding process, first a transferred plasma arc is struck by means of a high-frequency discharge between a non-consumable starter electrode upstream of the nozzle and the workpiece, the MIG arc is then struck and finally the nozzle is connected electrically to the starter electrode so that the plasma arc is taken over by the nozzle.

The welding process is started with an introductory arc discharge between the non-consumable starter electrode in the welding torch and the workpiece; for this purpose, first a transferred plasma arc is struck between the starter electrode and the workpiece by means of a high-frequency discharge. Said plasma arc is determined geometrically by the nozzle. The consumable electrode, which is connected to its voltage source, is then introduced into the plasma arc so that the MIG arc strikes without spatters. In this situation the plasma arc is stabilized geometrically also by the electromagnetic field of the current-carrying consumable electrode. Finally the nozzle is connected electrically to the starter electrode so that the plasma arc root is taken over by the nozzle after which the starting cycle is completed. The procedure according to the invention in addition presents the possibility of preheating the workpiece by means of the plasma arc between the starter electrode and the workpiece prior to striking the MIG arc.

The invention also relates to an apparatus for carrying out the method comprising a welding torch comprising a housing having a nozzle with a plasma aperture, a contact tube, a connection for the supply of a plasma gas, a first supply source to which the nozzle is connected and a second supply source to which the contact tube is connected, characterized in that a non-consumable starter electrode is arranged in the housing and, via a high-frequency generator, is also connected via a switch to the first supply source to which the nozzle is connected. When the switch is open, first a plasma arc is struck between the non-consumable starter electrode and the workpiece by means of a high-frequency discharge; as soon as the welding wire is supplied, the MIG arc strikes spontaneously and without spatters; after striking the MIG arc the switch may be closed so that the nozzle is electrically connected to the starter electrode and the plasma arc is taken over by the nozzle.

The invention will now be described in greater detail with reference to the drawing which shows an embodiment of an apparatus for carrying out the method according to the invention.

The device 1 comprises a welding torch 2 having a housing 3, a nozzle 5, and a plasma aperture 7. An electrode holder 8 having a non-consumable electrode 9, which may be of tungsten and which serves as a starter electrode, is arranged in the housing 3 eccentrically with respect to the plasma aperture 7. A welding wire 11 is conveyed through the plasma aperture 7 by means of a contact tube 13. The electrode holder 8 and the contact tube 13 are held in a cap 12 consisting of insulating material so that the housing, the contact tube and the starter electrode are insulated electrically from each other.

The transport of the welding wire 11 takes place by means of transport rollers 15 which are driven at a controllable speed by a motor 17. The welding torch 2 furthermore has a supply pipe 19 for the supply of a plasma gas A, for example argon. Connections 21 and a screen 20 serve for the supply of a shielding gas S, for example a mixture of argon with carbon dioxide. The housing 3, the electrode holder 8 and the contact tube 13 include cooling ducts of which only the cooling duct 22 of the housing 3 is shown in the drawing. The cooling ducts communicate with connections 23' and 23", 25' and 25", 27' and 27" for the inlet and outlet of cooling water W. The starter electrode 9 is connected via a connection contact 28 on the electrode holder 8, to one of the terminals of a first supply source 29 via a high-frequency generator 31. The welding wire 11 is connected, via a connection contact 32 on the contact tube 13, to one of the terminals of a second supply source 33. A workpiece 35 is connected to the other terminal of the supply sources 29 and 33.

The nozzle 5, which during welding serves as a non-consumable electrode for the plasma arc, is also connected to the first supply source 29 via a connection terminal 37 on the housing 3 and via a switch 39. The switch 39 may be constructed as a manual switch, preferably, however, as a magnetic switch.

For performing welding operations with the above-described device, the starter electrode 9, the contact tube 13 and the workpiece 35 are connected to the supply sources 29 and 33, the switch 39 being open. A plasma gas A is supplied through the supply duct 19. A shielding gas S is supplied via the connections 21. In the plasma gas stream a plasma arc is struck between the starter electrode 9 and the workpiece 35 by means of the supply source 29 and the high-frequency generator 31. The welding wire 11 is driven by means of the transport rollers 15 and introduced axially into the gas plasma produced by the plasma arc; a MIG arc is struck spontaneously and without spatters and is maintained by the supply source 33 between the welding wire 11 and the workpiece 35. By closing the switch 39 the nozzle 5 is connected electrically to the starter electrode 9, as a result of which the plasma arc root on the starter electrode 9 jumps over to the nozzle 5. The plasma arc between the nozzle 5 and the workpiece 35 is form then on maintained by the supply source 29.

What is claimed is:

1. A method of plasma-MIG welding, which comprises flowing a thermally ionizable inert gas past a starter non-consumable electrode through a nozzle non-consumable electrode toward a workpiece, first establishing a plasma arc by means of a high-frequency discharge between said starter non-consumable electrode and said workpiece to initiate and sustain a plasma flow, feeding a consumable electrode through said plasma flow toward the workpiece, secondly separately establishing a MIG-arc between said consumable electrode and said workpiece, and finally electrically connecting the nozzle non-consumable electrode with the starter non-consumable electrode so that the root of the plasma arc jumps from the starter non-consumable electrode to the nozzle non-consumable electrode.

2. A plasma-MIG welding apparatus, which comprises a welding torch provided with a starter non-consumable electrode and a nozzle non-consumable electrode downstream thereof; means for flowing a thermally ionizable inert gas past said starter non-consumable electrode through said nozzle non-consumable electrode toward a workpiece; a first circuit means consisting basically of a first power supply, a high-frequency generator, said starter non-consumable electrode, and said workpiece for establishing a plasma arc between the starter non-consumable electrode and the workpiece to initiate and sustain a plasma flow; means for feeding a consumable electrode through said plasma flow toward the workpiece; a second circuit means consisting basically of said consumable electrode, a second power supply, and said workpiece for separately establishing a MIG-arc between the consumable electrode and the workpiece; and a normally open switch means connected from between the first power supply and the high-frequency generator of the first circuit means to the nozzle non-consumable electrode, said switch means, upon being closed, electrically connecting the nozzle non-consumable electrode with the first power supply and thereby causing the root of the plasma arc to jump from the starter non-consumable electrode to said nozzle non-consumable electrode.

* * * * *